(12) United States Patent
Zhao et al.

(10) Patent No.: US 12,108,397 B2
(45) Date of Patent: Oct. 1, 2024

(54) DATA TRANSMISSION METHOD AND DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 428 days.

(21) Appl. No.: 17/524,735

(22) Filed: Nov. 11, 2021

(65) Prior Publication Data

US 2022/0078782 A1    Mar. 10, 2022

Related U.S. Application Data (63) Continuation of application No. PCT/CN2020/090237, filed on May 14, 2020.

(Continued)

(51) Int. Cl.
*H04W 72/20* (2023.01)
*H04L 1/1812* (2023.01)
*H04W 72/0446* (2023.01)

(52) U.S. Cl.
CPC ........... *H04W 72/20* (2023.01); *H04L 1/1812* (2013.01); *H04W 72/0446* (2013.01)

(58) Field of Classification Search
CPC ............. H04W 72/20; H04W 72/0446; H04W 52/367; H04L 1/1812; H04L 1/1854; H04L 1/1896; H04L 1/1861; H04L 1/1822

See application file for complete search history.

(56) References Cited

U.S. PATENT DOCUMENTS

2020/0220669 A1\* 7/2020 Park .................. H04L 1/1896
2020/0228251 A1\* 7/2020 Yeo .................... H04L 1/1822
(Continued)

FOREIGN PATENT DOCUMENTS

CN    109644443      4/2019
JP     2023175806 A \* 12/2023 ........... H04L 1/1861
(Continued)

OTHER PUBLICATIONS

Oppo, "Discussion on NR-V2X work item scope," 3GPP TSG-RAN Meeting #83, RP-190228, Mar. 2019, 3 pages.

(Continued)

*Primary Examiner* — Ayaz R Sheikh
*Assistant Examiner* — Louis Samara
(74) *Attorney, Agent, or Firm* — Hodgson Russ LLP (57) ABSTRACT

Embodiments of the present disclosure provide a data transmission method and device. The method comprises: monitoring PSCCHs in each slot within a slot set separately, to detect whether exists a PSCCH transmitted from a second terminal targeting to the first terminal in each slot within a slot set (S202); receiving an associated PSSCH based on each detected PSCCH targeting to the first terminal (S204); and transmitting one PSFCH carrying a HARQ feedback corresponding to each slot within the slot set in a slot corresponding to the slot set; wherein, the slot set comprises one or more slots (S206).

15 Claims, 6 Drawing Sheets

Related U.S. Application Data (60) Provisional application No. 62/847,898, filed on May 14, 2019.

(56) References Cited

U.S. PATENT DOCUMENTS

| | | | |
|---|---|---|---|
| 2020/0305176 A1* | 9/2020 | Hu | H04W 72/02 |
| 2020/0359375 A1* | 11/2020 | Hwang | H04L 1/1854 |
| 2022/0239447 A1* | 7/2022 | Yeo | H04W 76/14 |

FOREIGN PATENT DOCUMENTS

| | | | | |
|---|---|---|---|---|
| KR | 20200050820 A | * | 5/2020 | |
| KR | 20200087465 A | * | 7/2020 | |
| KR | 20220017487 A | * | 2/2022 | |
| WO | 2018090302 | | 5/2018 | |
| WO | 2018126410 | | 7/2018 | |
| WO | WO-2020153749 A1 | * | 7/2020 | H04L 1/1812 |

OTHER PUBLICATIONS

WIPO, International Search Report and Written Opinion for PCT/CN2020/090237, Aug. 18, 2020.

\* cited by examiner

ND DEVICE

CROSS-REFERENCE TO RELATED APPLICATION

The present application is a continuation of International Application No. PCT/CN2020/090237, filed May 14, 2020, which claims priority to U.S. Provisional Application No. 62/847,898, filed May 14, 2019, the entire disclosures of which are incorporated herein by reference.

TECHNICAL FIELD

The present disclosure relates to the field of wireless communication technologies, and more particularly, to a data transmission method and device.

BACKGROUND

In legacy design in Long Term Evolution (LTE) Vehicle-to-Everything (V2X) specifications, sidelink (SL) has been specified for direct communication between User Equipments (UEs). Sidelink physical channels includes: Physical Sidelink Control Channel (PSCCH) and Physical Sidelink Shared Channel (PSSCH). PSSCH is used to carry data from a sending UE for sidelink communication, and PSCCH indicates resource and other transmission parameters used by a receiving UE for PSSCH reception.

For the next generation of direct Vehicle-to-Everything (V2X) communication system to be based on the recently developed 5G (fifth generation) new radio (5G-NR) technology, it is required for the new system to support more advanced V2X use cases and services that could not be provided by the current LTE-V2X system. As such, HARQ (Hybrid Automatic Repeat Request) feedback in the physical layer shall be supported for SL unicast and groupcast. A new physical channel, physical SL feedback channel (PSFCH), is designed to carry HARQ feedback.

The above information disclosed in this Background section is only for enhancement of understanding of the background of the disclosure and therefore it may contain information that does not form the prior art that is already known in this country to a person of ordinary skill in the art.

SUMMARY

The present disclosure provides a data transmission method and device.

In a first aspect, the present disclosure provides a data transmission method, which may comprise monitoring PSCCHs in each slot within a slot set separately, to detect whether exists a PSCCH transmitted from a second terminal targeting to the first terminal in each slot within a slot set: receiving an associated PSSCH based on each detected PSCCH targeting to the first terminal; and transmitting one PSFCH carrying a HARQ feedback corresponding to each slot within the slot set in a slot corresponding to the slot set; wherein, the slot set comprises one or more slots.

In an embodiment of the present disclosure, there are N bit fields in the PSFCH: N equals to the number of slots within the slot set and each bit field corresponds to one slot within the slot set.

In an embodiment of the present disclosure, there are M bits in each bit field: M equals to the maximal number of TBs supported in one PSSCH and each bit corresponds to a HARQ feedback of one TB in the PSSCH.

In an embodiment of the present disclosure, there are M bits in each bit field: M equals to the maximal number of CBGs supported in one PSSCH and each bit corresponds to a HARQ feedback of one CBG in the PSSCH.

In an embodiment of the present disclosure, there are M bits in each bit field: M equals to the maximal number of TBs supported in one PSSCH multiplying by the maximal number of CBGs supported in one PSSCH and each bit corresponds to a HARQ feedback of one CBG per TB.

In an embodiment of the present disclosure, there are M bits in each bit field: M is pre-configured or configured per resource pool.

In an embodiment of the present disclosure, for each slot within the slot set, the HARQ feedback is set to NACK when the PSCCH transmitted from the second terminal targeting to the first terminal not being detected.

In an embodiment of the present disclosure, transmission resource of the PSFCH is determined based on the transmission resource of one of the detected PSCCHs, or based on transmission resource of the PSSCH which corresponds to one of the detected PSCCHs.

In an embodiment of the present disclosure, transmission resource of the PSFCH is determined based on the transmission resource of the first detected PSCCH, or based on transmission resource of the PSSCH which corresponds to the first detected PSCCH.

In an embodiment of the present disclosure, transmission resource of the PSFCH is determined based on the transmission resource of the last detected PSCCH, or based on transmission resource of the PSSCH which corresponds to the last detected PSCCH.

In an embodiment of the present disclosure, transmission resource of the PSFCH is determined based on the transmission resource of the PSCCH with the highest priority among the detected PSCCH, or based on transmission resource of the PSSCH which corresponds to the PSCCH with the highest priority among the detected PSCCH.

In an embodiment of the present disclosure, the transmission resource of the PSFCH includes the transmission resource of the PSFCH in frequency domain.

In an embodiment of the present disclosure, the transmission resource of the PSFCH includes the transmission resource of the PSFCH in code domain.

In an embodiment of the present disclosure, transmission resource of the PSFCH is indicated in at least one of the detected SCIs transmitted from the second terminal targeting to the first terminal.

In an embodiment of the present disclosure, transmission resource of the PSFCH is indicated by an index, which is used to determine the transmission resource of the PSFCH.

In an embodiment of the present disclosure, the index is configured in a table, in which different transmission resources with different indexes are pre-defined.

In an embodiment of the present disclosure, the transmission resource of the PSFCH includes at least one of following resources: transmission resource in frequency domain, transmission resource in time domain and transmission resource in code domain.

In an embodiment of the present disclosure, the time offset between the slot of PSFCH and the slot of PSSCH is pre-configured or configured by network.

In a second aspect, the present disclosure provides a data transmission method, which may comprise transmitting a PSCCH and associated PSSCH in any one or more of slots within a slot set to a first terminal; and receiving a PSFCH carrying a HARQ feedback corresponding to each slot within the slot set in a slot corresponding to the slot set: wherein, the slot set comprises one or more slots from the first terminal.

In an embodiment of the present disclosure, there are N bit fields in the PSFCH: N equals to the number of slots within the slot set and each bit field corresponds to one slot within the slot set.

In an embodiment of the present disclosure, there are M bits in each bit field: M equals to the maximal number of TBs supported in one PSSCH and each bit corresponds to a HARQ feedback of one TB in the PSSCH.

In an embodiment of the present disclosure, there are M bits in each bit field: M equals to the maximal number of CBGs supported in one PSSCH and each bit corresponds to a HARQ feedback of one CBG in the PSSCH.

In an embodiment of the present disclosure, there are M bits in each bit field: M equals to the maximal number of TBs supported in one PSSCH multiplying by the maximal number of CBGs supported in one PSSCH and each bit corresponds to a HARQ feedback of one CBG per TB.

In an embodiment of the present disclosure, there are M bits in each bit field: M is pre-configured or configured per resource pool.

In an embodiment of the present disclosure, the method further comprises: detecting the PSFCH in candidate transmission resources determined by the transmitted PSCCH or transmitted PSSCH sequentially.

In an embodiment of the present disclosure, the detecting the PSFCH in candidate transmission resources determined by the transmitted PSCCH or transmitted PSSCH sequentially comprises: detecting the PSFCH based on the transmitted PSCCH or the transmitted PSSCH from first to last sequentially.

In an embodiment of the present disclosure, the detecting the PSFCH in candidate transmission resources determined by the transmitted PSCCH or transmitted PSSCH sequentially comprises: detecting the PSFCH based on the transmitted PSCCH or the transmitted PSSCH from last to first sequentially.

In an embodiment of the present disclosure, the detecting the PSFCH in candidate transmission resources determined by the transmitted PSCCH or transmitted PSSCH sequentially comprises: detecting the PSFCH based on the transmitted PSCCH or the transmitted PSSCH according to priority from highest to lowest sequentially.

In an embodiment of the present disclosure, the candidate transmission resource includes the transmission resource in frequency domain.

In an embodiment of the present disclosure, the candidate transmission resource includes the transmission resource in code domain.

In an embodiment of the present disclosure, the method further comprises: filtering each candidate transmission resource.

In a third aspect, the present disclosure provides a terminal, which may comprise a receiving unit and a transmitting unit, wherein the receiving unit is configured to monitor PSCCHs in each slot within a slot set separately, to detect whether exists a PSCCH transmitted from a second terminal targeting to the terminal in each slot within a slot set and receive an associated PSSCH based on each detected PSCCH targeting to the terminal; the transmitting unit is configured to transmit one PSFCH carrying a HARQ feedback corresponding to each associated PSSCH in a slot corresponding to the slot set: the slot set comprises one or more slots.

In a fourth aspect, the present disclosure provides a terminal, which may comprise a transmitting unit and a receiving unit, wherein the transmitting unit is configured to transmit a PSCCH and associated PSSCH in any one or more of slots within a slot set to a first terminal: the receiving unit is configured to receive a PSFCH carrying a HARQ feedback corresponding to each slot within the slot set in a slot corresponding to the slot set from the first terminal: wherein, the slot set comprises one or more slots.

In a fifth aspect, the present disclosure provides a terminal device for performing the method in the above first aspect or any of the possible implementations of the first aspect. In particular, the terminal device includes functional modules for performing the method in the above first aspect or any of the possible implementations of the first aspect.

In a sixth aspect, the present disclosure provides a terminal device, including a processor and a memory: wherein the memory is configured to store instructions executable by the processor and the processor is configured to perform the method in the above first aspect or any of the possible implementations of the first aspect.

In a seventh aspect, the present disclosure provides a computer readable medium for storing computer programs, which include instructions for executing the above first aspect or any possible implementation of the first aspect.

In an eighth aspect, the present disclosure provides a computer program product including a non-transitory computer-readable storage medium storing a computer program, wherein the computer program is executable to cause a computer to perform the method in the above second aspect or any possible implementation of the second aspect.

In a ninth aspect, the present disclosure provides a computer program product including a non-transitory computer-readable storage medium storing a computer program, wherein the computer program is executable to cause a computer to perform the method in the above second aspect or any possible implementation of the second aspect.

In a tenth aspect, the present disclosure provides a terminal device for performing the method in the above second aspect or any of the possible implementations of the second aspect. In particular, the terminal device includes functional modules for performing the method in the above second aspect or any of the possible implementations of the second aspect.

In a eleventh aspect, the present disclosure provides a terminal device, including a processor and a memory: wherein the memory is configured to store instructions executable by the processor and the processor is configured to perform the method in the above second aspect or any of the possible implementations of the second aspect.

In a twelfth aspect, the present disclosure provides a computer readable medium for storing computer programs, which include instructions for executing the above second aspect or any possible implementation of the second aspect.

According to the data transmission method of the embodiment of the disclosure, one PSFCH carries all possible HARQ feedback information of PSSCHs within the corresponding slot set, which can avoid multiple PSFCHs transmission and power sharing among multiple PSFCH transmissions. For UE not supporting to transmit multiple channels at the same time, the method also provides a way to feedback PSSCHs corresponding to the same slot set.

In addition, in other embodiments of the disclosure, the data transmission method further provides multiple mechanisms for determining PSFCH transmission resources, which can ensure correct reception of PSFCH by TX UE.

This section provides a summary of various implementations or examples of the technology described in the disclosure, however, it is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Exemplary embodiments of the disclosure will now be described more fully with reference to the accompanying drawings, in which exemplary embodiments are shown. Exemplary embodiments of the disclosure may, however, be embodied in many different forms and should not be construed as being limited to the embodiments set forth herein; rather, these embodiments are provided so that this disclosure will be thorough and complete, and will fully convey the concept of exemplary embodiments to those skilled in the art. In the drawings, the thicknesses of layers and regions are exaggerated for clarity. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, materials, or operations are not shown or described in detail to avoid obscuring aspects of the disclosure.

In the present disclosure, terms such as "connected" and the like should be understood broadly, and may be directly connected or indirectly connected through an intermediate medium, unless otherwise specified. The specific meanings of the above terms in the present disclosure can be understood by those skilled in the art on a case-by-case basis.

Further, in the description of the present disclosure, the meaning of "a plurality", "multiple" or "several" is at least two, for example, two, three, etc., unless specifically defined otherwise. "And/or", describing the association relationship of the associated objects, indicates that there may be three relationships, such as A and/or B, which may indicate that there are three cases of single A, single B and both A and B. The symbol "/" generally indicates that the contextual object is an "or" relationship. The terms "first" and "second" are used for descriptive purposes only and are not to be construed as indicating or implying a relative importance or implicitly indicating the number of technical features indicated. Thus, features defining "first" and "second" may include one or more of the features either explicitly or implicitly.

Figure 1:
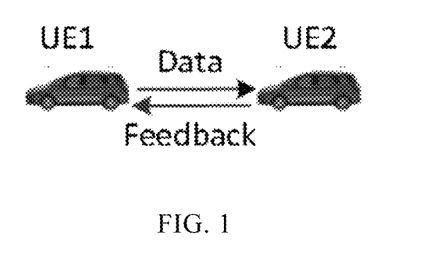
FIG. 1 illustrates an example of data transmission with feedback on SL.

In NR-V2X communication system, unicast, groupcast and broadcast are all supported. For unicast and groupcast, to improve reliability and resource efficiency, PSFCH to carry HARQ ACK/NACK on SL is introduced. FIG. 1 illustrates an example of data transmission with feedback on SL. Referring FIG. 1, UE1 is a sending UE (User Equipment) (referred to as TX UE below) and UE2 is a receiving UE (referred to as RX UE below). UE2 can feedback HARQ ACK/NACK to UE1 on PSFCH to assist UE1's re-transmission. Based on the feedback from UE2, UE1 can determine whether to do re-transmission or a new transmission.

Figure 2:
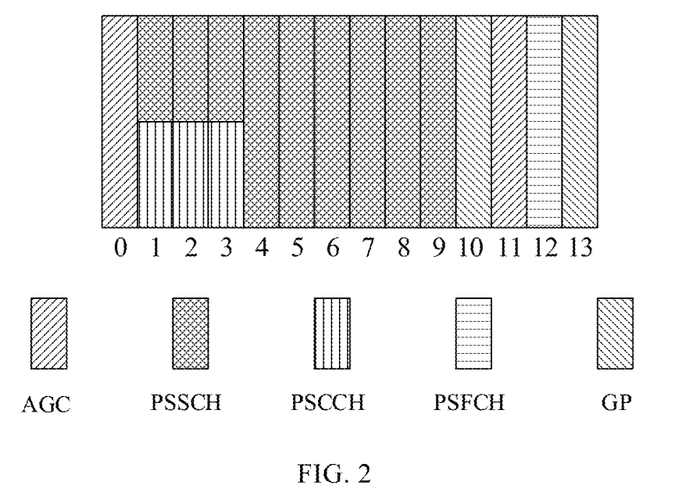
FIG. 2 illustrates an example of slot structure in NR-V2X system.

PSFCH may occupy one OFDM (Orthogonal Frequency Division Multiplexing) symbols in time domain in a slot. FIG. 2 illustrates an example of slot structure in NR-V2X system. As shown in FIG. 2, there are 14 OFDM symbols per slot including AGC (Automatic Gain Control) symbols and GP (Guard Period) symbols. And the OFDM symbol for PSFCH transmission may be defined in symbol 12. The preceding OFDM symbol (symbol 11) of the OFDM symbol used for PSFCH (symbol 12) can be a duplicate of the PSFCH channel, and it can be used as AGC symbol.

The transmission resource of PSFCH can be determined by the following methods. The transmission resource of PSFCH can be allocated or determined by the network device (such as gNB, ng-NB or eNB), if the transmission resource of SL is allocated by the network device. The transmission resource of PSFCH can also be determined and be transmitted to the RX UE by the TX-UE. The transmission resource of PSFCH can also be determined implicitly by the RX UE. E.g. a mapping relation between the transmission resources of PSSCH/PSCCH and PSFCH is configured, and the RX UE can implicitly determine the transmission resource of PSFCH based on this configured mapping relation and the transmission resource of the corresponding PSSCH/PSCCH.

In NR-V2X system, it is supported that PSFCH can exist in every N slot, where N is an integer and N>=1. In case of N=1, it means that PSFCH can exist in each slot. And in case of N>1, there can be one slot per N slots within which PSFCH exist.

Figure 3:
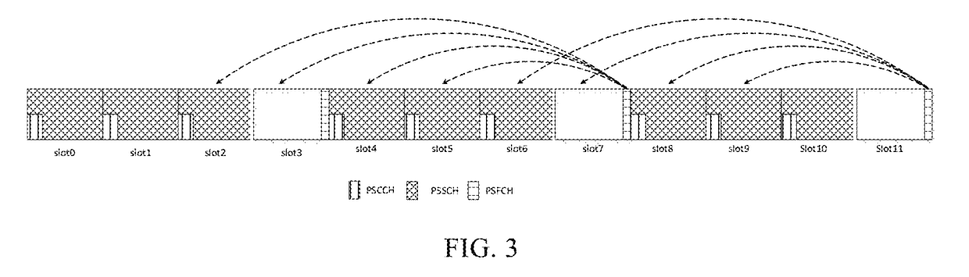
FIG. 3 illustrates an example of PSFCH transmission in case of N=4.

FIG. 3 illustrates an example of PSFCH transmission in case of N=4. As shown in FIG. 3, there is one slot (referred to as PSFCH slot below and shown as slot 3/7/11 for example) used for PSFCH transmission per every 4 slots. For each PSFCH slot, it corresponds to 4 slots used for PSSCH transmission which can be seen as a slot set. For example, the PSFCH slot 7 corresponds to the slot set which includes slot 2, slot 3, slot 4 and slot 5, and that means the HARQ feedback (ACK or NACK) corresponds to the PSSCH within the slot set with slots 2, 3, 4 and 5 would be fed back by PSFCH in slot 7. The PSFCH slot 11 corresponds to the slot set which includes slot 6, slot 7, slot 8 and slot 9, and that means the HARQ feedback (ACK or NACK) corresponds to the PSSCH within the slot set with slots 6, 7, 8 and 9 would be fed back by PSFCH in slot 11. The timing gap between the PSFCH slot and the last slot of the slot set that it corresponds to can be configured or pre-configured, or determined by the minimal processing capability of a UE.

Referring to FIG. 3, if the TX UE transmits PSSCH in slots 2, 3, 4 and 5 using the same sub-channel(s) or the different sub-channel(s) separately, the HARQ feedback needs to be transmitted in slot 7. A sub-channel is a set of continuous PRBs (Physical Resource Block) in frequency domain. Then how to transmit HARQ feedbacks for different slot in one PSFCH needs to be considered.

Furthermore, for N=1, there is one-to-one mapping between the transmission resource of PSFCH and PSSCH. Then the transmission resource of PSFCH can be determined by the associated PSSCH transmission resource. For example, the timing gap between PSFCH and the associated PSSCH is (pre-)configured. The frequency starting position of PSFCH is aligned to the frequency starting position of PSSCH, and the frequency length of PSFCH is fixed to 1 PRB. For N>1, in case of TX UE transmits PSSCH in different slots using different sub-channel, how to determine the PSFCH transmission resource also needs to be considered.

Targeting for the aforementioned problem, the feedback channel can be as follows:

One PSFCH carries all of the HARQ feedback information corresponding to multiple PSSCH transmission, such as multiple PSSCH transmission within the aforesaid slot set. There are multiple bit fields in PSFCH information bits: each of them corresponds to one possible PSSCH transmission within the slot set. The number of bit fields is equal to the number of slots within the slot set, which corresponds to the PSFCH in the same slot. The number of bits per bit field is determined by the maximal number of TB (Transport Block) per PSSCH transmission, and/or, the maximal number of CBG (Code block group) per TB.

The transmission resource of PSFCH is determined by the transmission resource of first decoded PSCCH, or the transmission resource of PSSCH associated to the first decoded PSCCH within the slot set. The timing gap between PSFCH and the PSCCH or PSSCH is pre-configured, or configured by network. The frequency starting position of PSFCH can be determined by the PSCCH or PSSCH. The frequency length of PSFCH is pre-configured or configured by network. From TX UE side, which needs to detect PSFCH from RX UE, it can blind detecting PSFCH on the candidate transmission resource which is based on the transmitted PSCCH/PSSCH within the slot set.

With reference to the accompanying drawings, a data transmission method and equipment provided by the embodiments of the present disclosure will be specifically described below.

It is to be understood that the technical solutions of the present disclosure may be used in various wireless communication systems, for example, Global System of Mobile communication (GSM), General Packet Radio Service (GPRS), Wideband Code Division Multiple Access (WCDMA), High-Speed Packet Access (HSPA), LTE, LTE-Advanced (LTE-A), New Radio (NR) and so on. Furthermore, the communication between a terminal and a network device in the wireless communication network may be performed according to any suitable generation communication protocols, including, but not limited to, the second generation (2G), 2.5G, 2.75G, the third generation (3G), the fourth generation (4G), 4.5G, the fifth generation (5G) communication protocols, and/or any other protocols either currently known or to be developed in the future.

It is to be understood that the term "terminal" refers to any end device that can access a wireless communication network and receive services therefrom. The terminal may include user equipment (UE), which is also referred to as a mobile terminal or mobile user equipment and so on. The user equipment may be a mobile terminal such as a mobile telephone (also referred to as a cellular telephone) or a computer having a mobile terminal such as portable, pocket, hand-held, vehicle-mounted mobile apparatuses or a mobile apparatus with a built-in computer.

It is to be understood that the term "network device" refers to a device in a wireless communication network via which a terminal accesses the network and receives services therefrom. The network device may include a base station (BS), an access point (AP), a Mobile Management Entity (MME), a Multi-cell/Multicast Coordination Entity (MCE), a Access and Mobility Management Function (AMF)/User Plane Function (UPF), a gateway, a server, a controller or any other suitable device in the wireless communication network. The BS may be, for example, a base transceiver station (BTS) in the GSM or the CDMA, or may be a Node B in the WCDMA, or may be an evolutional Node B (eNB or e-NodeB) in the LTE or the LTE-A, or may be a gNB or ng-eNB in the NR, and the present disclosure is not limited thereto.

Figure 4:
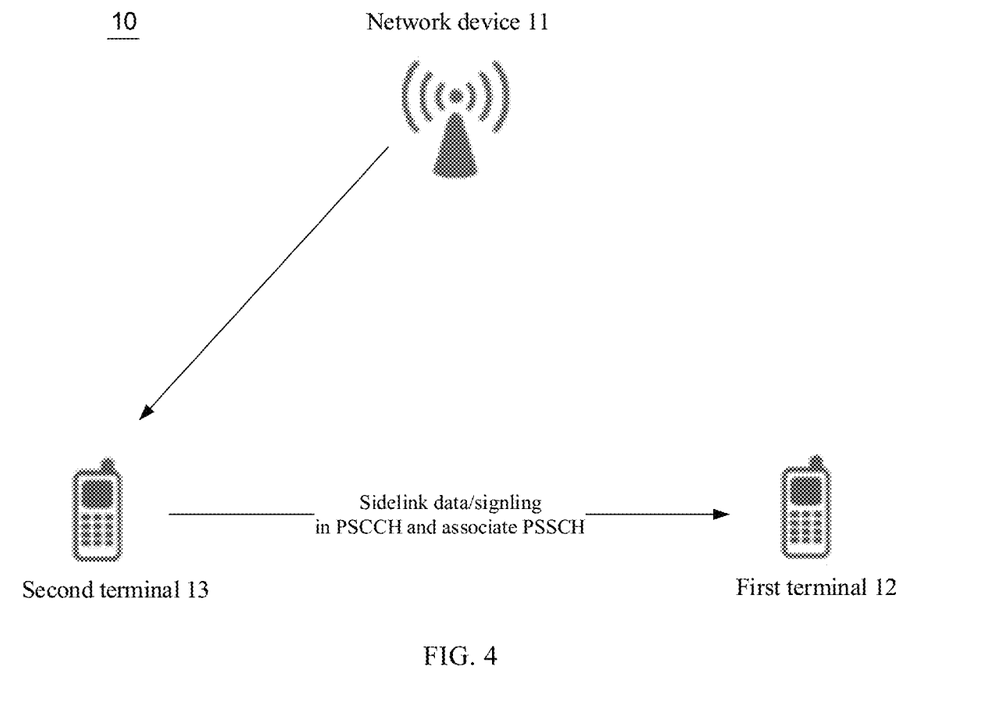
FIG. 4 schematically illustrates a data transmission system architecture according to an embodiment of the present disclosure.

FIG. 4 schematically illustrates a data transmission system architecture according to an embodiment of the present disclosure.

Referring to FIG. 4, the data transmission system 10 comprises: a network device 11, a first terminal 12 (which refers here to a receiving terminal) and a second terminal 13 (which refers here to a sending terminal).

Communication between the network device 11 and the second terminal 13, as well as communication between the network device 11 and the first terminal 12, is implemented through a first-type air interface (e.g. a LTE Uu or NR Uu Interface in cellular mobile communication). And communication between the first terminal 12 and the second terminal 13 is implemented through a second-type air interface (e.g. a SL air interface).

SL resource(s) for the second terminal 13 transmission can be scheduled by the network device 11. Or, the second terminal 13 can determine, i.e. the network device 11 does not schedule, SL transmission resource(s) within SL resources configured by network (e.g. the network device 11) or pre-configured SL resources.

It can be understood that in the data transmission system 10, there may be multiple receiving terminals and sending terminals. In FIG. 4, in order to simplify the drawing, only the first terminal 12 and the second terminal 13 are exemplarily illustrated. However, it does not mean that the number of the receiving terminals and the sending terminals is limited.

It should be noted that the SL data (e.g. being transmitted from the second terminal 13 to the first terminal 12 shown in FIG. 4) may include user data of the user plane, and may also include signaling or messages of the control plane.

As mentioned above, in case of N>1, it is possible that one UE transmits multiple PSSCH in different slots which corresponds to HARQ feedback transmission within the same slot.

Figure 5:
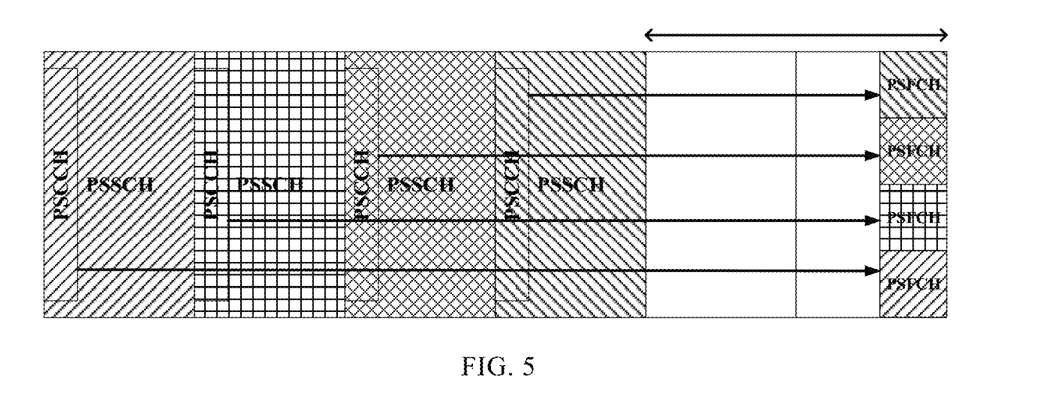
FIG. 5 illustrates an example of multiple PSFCH transmissions.

For example in FIG. 3, TX UE (e.g. the second terminal 13 shown in FIG. 4) can transmit PSSCH to RX UE (e.g. the first terminal 12 shown in FIG. 4) in slots 2, 3, 4, and 5 separately, and the PSFCH corresponds to each PSSCH is within the same slot 7. If separate PSFCH resource is used for each PSSCH of different slot, then RX UE needs to transmit multiple PSFCHs within the same slot. An illustration is shown in FIG. 5. That will cause power sharing among multiple PSFCH transmissions. Furthermore, if UE cannot support to transmit multiple channels at the same time, then it cannot transmit multiple PSFCHs in the same slot.

It should be noted that, in the data transmission method provided by the embodiments of the present disclosure, the said PSCCHs/PSSCHs transmitted to one RX UE (e.g. the first terminal 12 shown in FIG. 4) in different slots (e.g. slots 2, 3, 4, or 5 in FIG. 3) within one slot set are transmitted by one TX UE (e.g. the second terminal 13 shown in FIG. 4). And the said PSFCH transmitted by the RX UE is corresponding to the PSSCHs transmitted by the TX UE.

One embodiment is to use one PSFCH channel carrying all of the HARQ feedback of the corresponding slot set. For example, in FIG. 5, if TX UE transmits multiple PSSCHs within the slot set, only one PSFCH is transmitted which is used to carry all of the HARQ feedback information.

In case of N>1, there are N bit fields in PSFCH. Each bit field in PSFCH corresponds to the feedback of one PSSCH within the slot set.

Figure 6:
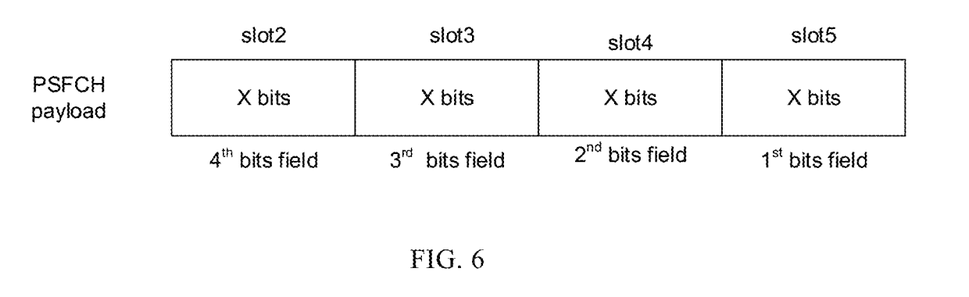
FIG. 6 illustrates an example of PSFCH payload with 4 bit fields.

For example, N=4 as shown in FIG. 3, and the PSFCH in slot 7 corresponds to the slot set of slots 2, 3, 4 and 5. Then there will be 4 separate bit fields in the PSFCH, each of the bit field carries the HARQ feedback corresponding to PSSCH of one slot in the slot set separately. One illustration is shown in FIG. 6. In FIG. 6, N=4. There are 4 bit fields in the PSFCH payload, each of them carries HARQ feedback corresponding to PSSCH of slots 2, 3, 4 and 5 separately. For example, the 1st bit field corresponds to PSSCH in slot 5, and 2nd bit field corresponds to PSSCH in slot 4, and so on.

The mapping between the position of bit field in PSFCH and slot index within the slot set is not limited to the examples described herein. For example, it is possible that the 1st bit field corresponds to slot 2 and the 2nd bit field corresponds to slot 3, etc.

The number of bits of each bit field in PSFCH is the same. And the number of bits of each bit field is determined by the maximal possible number of HARQ feedback information bits corresponds to one PSSCH transmitted within the slot set. And the maximal possible number of HARQ feedback information bits corresponds to one PSSCH can be determined by at least one of the following factors:

The first one is maximal number of TB per PSSCH transmission. The maximal number of TB per PSSCH transmission can be pre-configured, configured by network, configured by cluster header, or determined by PC5-RRC signaling. For example, if only 1 TB per PSSCH transmission is supported, then only 1 HARQ feedback information bit is needed for each PSSCH transmission, i.e., only 1 bit of each bit field in PSFCH. If up to 2 TB per PSSCH transmission is supported, then 2 HARQ feedback information bits is needed for each PSSCH transmission, i.e., 2 bits of each bit field in PSFCH.

If CBG feedback is supported, the maximal number of HARQ feedback information bits is determined by the maximal number of CBG which can be supported by each PSSCH transmission. The maximal number of CBG per PSSCH transmission can be pre-configured, configured by network, configured by cluster header, or determined by PC5-RRC signaling. For example, if maximal number of CBG per PSSCH is 4, then there will be 4 bits of each bit field in PSFCH.

For TB based HARQ feedback, there is 1 HARQ feedback bit corresponds to each TB. For CBG based HARQ feedback, there is 1 HARQ feedback bit corresponds to each CBG. One TB can be divided to several CBGs.

If only TB based HARQ feedback is supported, then the number of HARQ feedback information bits of each bit field in PSFCH is determined by the maximal number of TB per PSSCH transmission. If CBG based HARQ feedback is supported, then the number of HARQ feedback information bits of each bit field in PSFCH is determined by the multiply of maximal number of TB per PSSCH transmission and the maximal number of CBG per PSSCH transmission.

For a slot within the slot set, if RX UE cannot detect PSCCH of TX UE, there are two possibilities: the first one is that TX UE does transmit PSCCH, but RX UE failed to decode it, which can be seen as DTX (discontinuous transmission); the second one is that TX UE does not transmit PSCCH. No matter which case it is, the HARQ feedback information bits corresponding to this slot will be set to NACK in PSFCH. If RX UE fails to decode PSCCH, that will cause DTX. However, TX UE does not know the DTX status of RX UE, resulting in SL data lost. RX UE feedback HARQ NACK if it cannot detect PSCCH of TX UE for a slot within the slot set, that can make TX UE know whether RX UE has correctly decoded the PSCCH for each slot within the slot set.

If RX UE decodes the PSCCH of TX UE correctly, then whether the HARQ feedback information bits corresponding to this slot is set to ACK or NACK depends on the decoding status of PSSCH which is scheduled by the PSCCH. From the TX UE side, when it receives NACK feedback from RX UE, it can determine that RX UE does not decode the PSSCH correctly, no matter whether the PSCCH or PSSCH detected failure.

Figure 7:
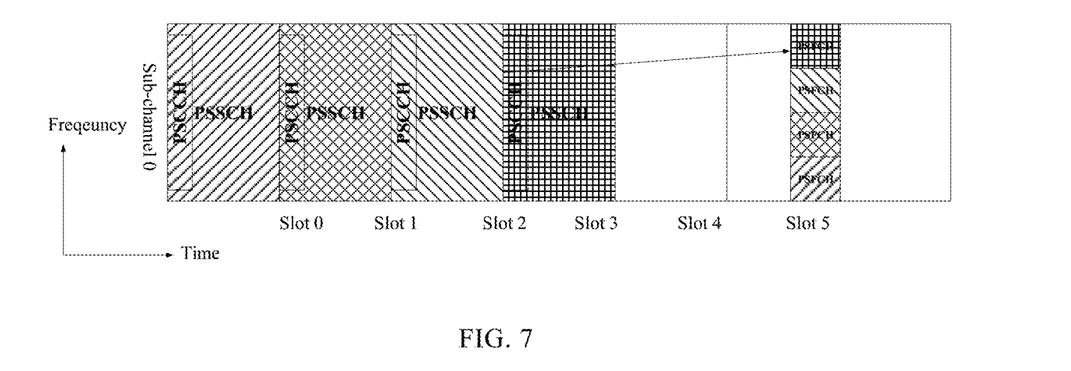
FIG. 7 illustrates an example of multiple PSCCH/PSSCH transmissions by multiple UEs.

As mentioned above, how to determine the transmission resource of PSFCH needs to be considered. In case of N>1, PSFCH corresponding to PSSCH within a slot set will be transmitted in the same slot. If different UEs transmit PSSCHs using the same frequency resource in different slots, multiple PSFCH transmissions in the same slot will be transmitted using orthogonal transmission resource. One example is shown below. For example, as shown in FIG. 7, if UE1, UE2, UE3 and UE4 transmit PSSCH in slot 0, 1, 2 and 3 using the same frequency resource (e.g. sub-channel 0) separately, then there will be orthogonal transmission resource of PSFCH in slot 5 which corresponds to the PSSCH transmissions in different slots. FIG. 7 shows using FDM among PSFCH transmission resource to promise orthogonal transmission resource. Other methods, such as CDM, can also be applied.

If one UE transmits PSSCHs in different slots using the same frequency resource, or using the different frequency resource, there will be only one PSFCH which carries all of HARQ feedback information. Then how to decide the transmission resource is provided bellow.

Figure 8:
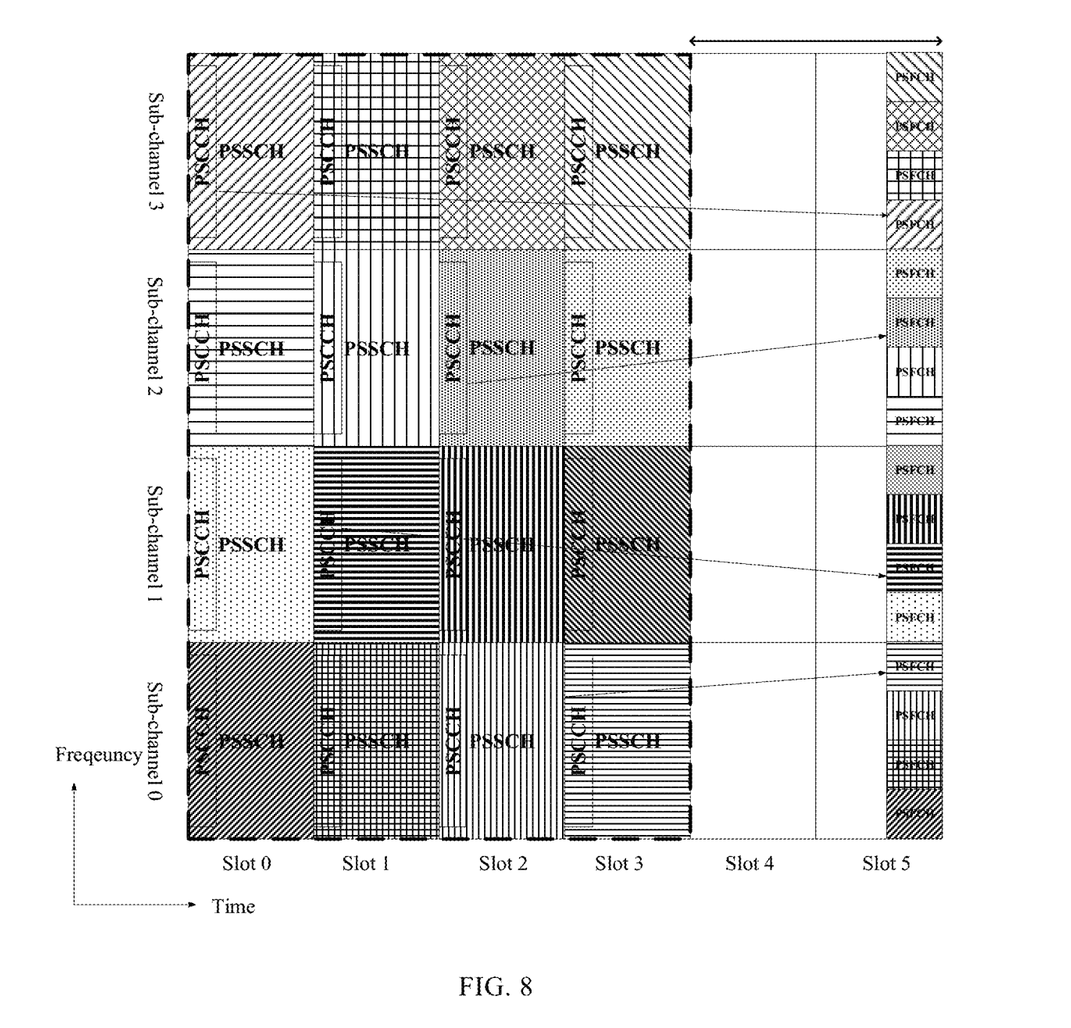
FIG. 8 illustrates an example of the transmission resource determined by the PSCCH/PSSCH transmission resource.

One example is shown in FIG. 8. If UE1 transmits PSSCH in slot 0) using sub-channel 3, the transmission resource can be determined by the PSSCH transmission resource, which is shown in FIG. 8. Similarly, if UE1 transmits PSSCH in slot 1 using sub-channel 1, transmits PSSCH in slot 2 using sub-channel 2 and transmits PSSCH in slot 3 using sub-channel 0 to UE2, the transmission resource of PSFCH can be determined by the corresponding PSSCH separately. For example, the transmission resource of PSFCH can be determined by the slot index, the starting sub-channel index of the corresponding PSSCH. The number of sub-channel used by the corresponding PSSCH can also be used to determine the transmission resource of PSFCH. Furthermore, the sequence of PSFCH can be determined by the identity of UEL, and/or identity of UE2. The identity can be either Radio Network Temporary Identifier (RNTI) or in-group member ID.

If one PSFCH is used to carry all of HARQ feedback, then the transmission resource of PSFCH is determined by the transmission resource of the first detected PSCCH, or by the transmission resource of PSSCH which corresponds to the first detected PSCCH.

For example, in FIG. 8, UE1 transmits PSSCH to UE2 in different slots using different sub-channel. If UE2 can receive PSCCH in slot 0) correctly, then it can determine the transmission resource based on the PSCCH or its associated PSSCH. While if it missed the PSCCH in slot 0, but it can receive PSCCH in slot 1 correctly, it can determine the transmission resource based on the PSCCH in slot 1 or its associated PSSCH.

From the TX UE side, it needs to detect PSFCH transmitted from RX UE. While it cannot know whether there is PSCCH missed by RX UE, and which slot is the first slot that RX UE detect PSCCH. But it can know that the transmission resource of PSFCH from RX UE can only be determined by the resource of transmitted PSCCH/PSSCH from TX UE. Then it can do blind detection of PSFCH in all of the possible transmission resource which is determined by the transmitted PSCCH/PSSCH.

For example, in FIG. 8, if TX UE transmits PSSCH in slots 0, 1, 2 and 3, there are 4 possible PSFCH transmission resources which are determined by the four transmitted PSSCH resource separately. Each PSSCH transmission can be used to determine a transmission resource of PSFCH. Since it does not know which the first correctly decoded PSCCH is, it has to do blind detection of all of 4 transmission resources of PSFCH.

If TX UE transmits PSSCH in slot 0) and slot 1, there are 2 possible PSFCH transmission resources. Since it does not know which the first correctly decoded PSCCH is, it has to do blind detection of all of 2 transmission resources.

If TX UE transmits PSSCH only in slot 2, there is 1 possible PSFCH transmission resource. It can detect PSFCH on the only possible transmission resource. Therefore, the maximal number of blind detection of PSFCH depends on the number of PSSCHs transmitted within the slot set. If there are M (M<=N) PSSCHs transmitted, TX UE needs to blind decode PSFCH at most M times. Once a PSFCH is detected, it can stop detecting other candidate PSFCH transmission(s) from RX UE.

In an alternative embodiment, TX UE can transmit indicator which is used to determine the transmission of PSFCH. If only one PSFCH is used to carry all HARQ feedback information bits, the PSSCH of different slots will corresponds to the same PSFCH. Therefore, the transmission resource of PSFCH can be determined by TX UE. TX UE can transmit an indicator to RX UE which is used to determine the transmission resource. The indicator can indicate one for the following information: transmission resource of PSFCH in time domain, and/or in frequency domain, and/or in code domain: or an index which is used to determine the transmission resource of PSFCH.

As to the index, for example, a table is pre-configured or configured by network, wherein an index corresponds to a transmission resource. Then the TX UE can transmit an index to RX UE. RX UE can determine the transmission resource of PSFCH based on the index and the table.

The indicator can be carried by SCI (Sidelink Control Information) or PSCCH. If TX UE transmits multiple PSSCHs within the slot set, the indicator among multiple SCI or PSSCH should indicate the same transmission resource of PSFCH.

For a TX UE to receive PSFCH from RX UE, it can do band-pass filter to the possible transmission resource of each PSFCH frequency resource. After that it can does PSFCH detection. When TX UE detects PSFCH from RX UE, it can know the candidate transmission resource of each PSFCH. To mitigate IBE (in-band emission) effect, it can do band-pass filter to each candidate transmission resource of each possible PSFCH frequency resource so that the IBE effect of other UEs in other frequency resource can be mitigated.

This embodiment can be applied to any PSFCH reception. For example, it can be applied to both N=1 and N>1 cases. It can be applied to receive PSFCH from one RX UE, or from multiple RX UEs.

Figure 9:
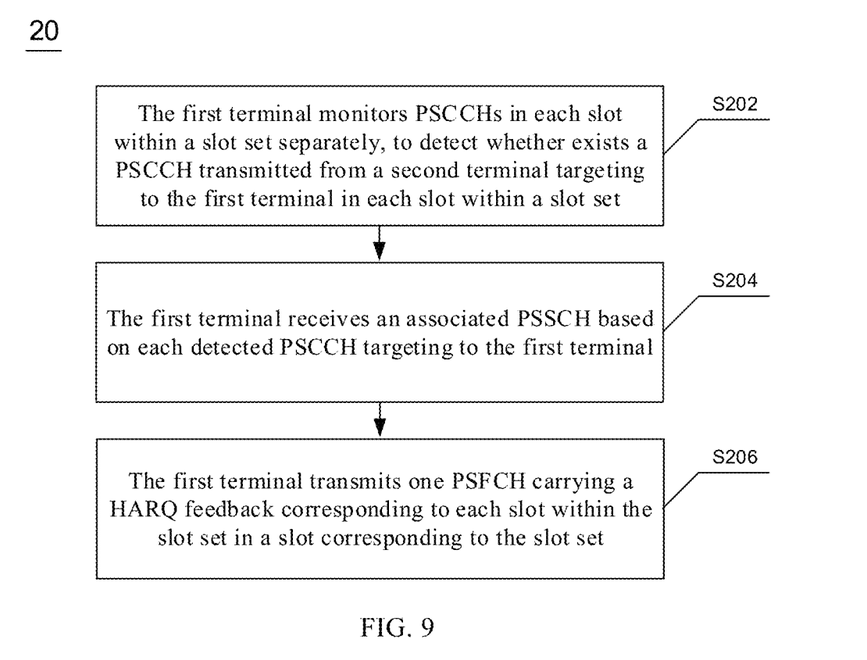
FIG. 9 schematically illustrates a flowchart of a data transmission method according to an embodiment of the present disclosure.

FIG. 9 schematically illustrates a flowchart of a data transmission method according to an embodiment of the present disclosure. The method may be applied, for example, to the first terminal 12 in FIG. 4.

Referring to FIG. 9, the method 20 comprises:

In Step S202, the first terminal monitors PSCCHs in each slot within a slot set separately, to detect whether exists a PSCCH transmitted from a second terminal targeting to the first terminal in each slot within a slot set.

The configured resource for PSCCHs transmission may be pre-configured or configured by network.

As mentioned above, for each PSFCH slot, it corresponds to N slots used for PSSCH transmission which can be seen as a slot set. N is an integer and N>=1.

In order to detect whether exists a PSCCH transmitted from the second terminal targeting to the first terminal in each slot within a slot set, the first terminal shall monitor configured PSCCHs in each slot separately.

In Step 204, the first terminal receives an associated PSSCH based on each detected PSCCH targeting to the first terminal.

If the first terminal receives the PSCCH and decodes the PSCCH correctly, it means that the first terminal detects the PSCCH. Then the first terminal receives the associated PSSCH based on the PSCCH. A PSSCH is said to be "associated" to a PSCCH when the PSCCH carries at least the SCI necessary to decode the PSSCH.

In Step 206, the first terminal transmits one PSFCH carrying a HARQ feedback corresponding to each slot within the slot set in a slot corresponding to the slot set.

As mentioned above, in case of N>1, if separate PSFCH resource is used for each PSSCH of different slot, then RX UE needs to transmit multiple PSFCHs within the same slot. That will cause power sharing among multiple PSFCH transmissions.

In order to avoid multiple PSFCHs transmission, one PSFCH is used to carrying all of the HARQ feedback of the corresponding slot set.

In an embodiment of the present disclosure, there are N bit fields in the PSFCH. N equals to the number of slots within the slot set and each bit field corresponds to one slot within the slot set. As shown in FIG. 6, for example, N=4, there are 4 bit fields in the PSFCH payload, each of them carries HARQ feedback corresponding to PSSCH of slots 2, 3, 4 and 5 separately. For example, the 1st bit field corresponds to PSSCH in slot 5, and 2nd bit field corresponds to PSSCH in slot 4, and so on.

The mapping between the position of bit field in PSFCH and slot index within the slot set is not limited to the examples described herein. For example, it is possible that the 1st bit field corresponds to slot 2 and the 2nd bit field corresponds to slot 3, etc.

For N=1, i.e., the slot set includes one slot. There will be one bit field corresponding to the only slot.

The number of bits of each bit field in PSFCH may be the same. And the number of bits of each bit field is determined by the maximal possible number of HARQ feedback information bits corresponds to one PSSCH transmitted within the slot set.

E.g. for TB based HARQ feedback, there is 1 HARQ feedback bit corresponds to each TB. The maximal number of TB per PSSCH transmission can be pre-configured, or configured by network.

For CBG based HARQ feedback, there is 1 HARQ feedback bit corresponds to each CBG. One TB can be divided to several CBGs. The maximal number of CBG per PSSCH transmission can be pre-configured, or configured by network.

If only TB based HARQ feedback is supported, then the number of HARQ feedback information bits of each bit field in PSFCH is determined by the maximal number of TB per PSSCH transmission. If CBG based HARQ feedback is supported, then the number of HARQ feedback information bits of each bit field in PSFCH is determined by the multiply of maximal number of TB per PSSCH transmission and the maximal number of CBG per PSSCH transmission.

The number of bits of each bit field in PSFCH may also be pre-configured or configured per resource pool. A resource pool is a set of time-frequency resources that can be used for SL transmission and/or reception.

In an embodiment of the present disclosure, for each slot within the slot set, the HARQ feedback is set to NACK when the PSCCH transmitted from the second terminal targeting to the first terminal not being detected.

As mentioned above, for a slot within the slot set, if RX UE cannot detect PSCCH of TX UE, there are two possibilities: the first one is that TX UE does transmit PSCCH, but RX UE failed to decode it, which can be seen as DTX (discontinuous transmission); the second one is that TX UE does not transmit PSCCH. No matter which case it is, the HARQ feedback information bits corresponding to this slot will be set to NACK in PSFCH. If RX UE fails to decode PSCCH, that will cause DTX. However, TX UE does not know the DTX status of RX UE, resulting in SL data lost. RX UE feedback HARQ NACK if it cannot detect PSCCH of TX UE for a slot within the slot set, that can make TX UE know whether RX UE has correctly decoded the PSCCH for each slot within the slot set.

In an embodiment of the present disclosure, transmission resource of the PSFCH is determined based on the transmission resource of one of the detected PSCCHs, or based on transmission resource of the PSSCH which corresponds to one of the detected PSCCHs.

For N=1, transmission resource of the PSFCH may be determined by the transmission resource of the detected PSCCH or by transmission resource of the PSSCH which corresponds to the detected PSCCH.

For N>1, transmission resource of the PSFCH may be determined by the transmission resource of the first detected PSCCH, or by transmission resource of the PSSCH which corresponds to the first detected PSCCH. As shown in FIG. 8, the second terminal transmits PSSCH to the first terminal in different slots using different sub-channel. If the first terminal can receive PSCCH in slot 0) correctly, then it can determine the transmission resource based on the PSCCH or its associated PSSCH. While if it missed the PSCCH in slot 0, but it can receive PSCCH in slot 1 correctly, it can determine the transmission resource based on the PSCCH in slot 1 or its associated PSSCH.

For N>1, transmission resource of the PSFCH may also be determined by the transmission resource of the last detected PSCCH, or by transmission resource of the PSSCH which corresponds to the last detected PSCCH.

Transmission resource of the PSFCH may also be determined by the transmission resource of the PSCCH with the highest priority among the detected PSCCH, or by transmission resource of the PSSCH which corresponds to the PSCCH with the highest priority among the detected PSCCH. The priority information may be carried in PSCCH. For example, 3 bits is used to indicate the priority level, wherein the value 0 corresponds to the highest priority and the value 7 corresponds to the lowest priority, or the value 7 corresponds to the highest priority and the value 0 corresponds to the lowest priority.

The transmission resource of the PSFCH corresponding to different transmission resource of PSCCHs or PSSCH includes the resource in frequency domain, and/or the resource in code domain.

For the resource in frequency domain, a PSFCH may occupy one or more PRBs in frequency domain. As shown in FIG. 8, different PSCCH/PSSCH corresponds to different PSFCH.

For the resource in code domain, a PSFCH may be code division channel and different PSCCH/PSSCH corresponds to different PSFCH.

In an alternative embodiment of the present disclosure, transmission resource of the PSFCH is indicated in SCI decoded from at least one of the detected PSCCHs, or transmission resource of the PSFCH is indicated in at least one of the detected PSCCHs. E.g. transmission resource of the PSFCH is indicated by an index, which is used to determine the transmission resource of the PSFCH. The index may be configured in a table, in which different transmission resources with different indexes are pre-defined. The transmission resource of the PSFCH includes at least one of following resources: transmission resource in frequency domain, transmission resource in time domain and transmission resource in code domain.

In NR-V2X system, two stage SCI may be used. The first stage SCI carried in PSCCH and the second stage SCI is carried in the resource of PSSCH. Both of them carry part of SCI. Transmission resource of the PSFCH may also be indicated in at least one of the detected SCIs transmitted from the second terminal targeting to the first terminal. For example, transmission resource of the PSFCH may be indicated in the second stage SCI. In the same way, transmission resource of the PSFCH may also be indicated by an index, which is used to determine the transmission resource of the PSFCH. The index may be configured in a table, in which different transmission resources with different indexes are pre-defined. The transmission resource of the PSFCH includes at least one of following resources: transmission resource in frequency domain, transmission resource in time domain and transmission resource in code domain.

According to the data transmission method of the embodiment of the disclosure, one PSFCH carries all possible HARQ feedback information of PSSCHs within the corresponding slot set, which can avoid multiple PSFCHs transmission and power sharing among multiple PSFCH transmissions. For UE not supporting to transmit multiple channels at the same time, the method also provides a way to feedback PSSCHs corresponding to the same slot set.

In addition, in other embodiments of the disclosure, the data transmission method further provides multiple mechanisms for determining PSFCH transmission resources, which can ensure correct reception of PSFCH by TX UE.

Figure 10:
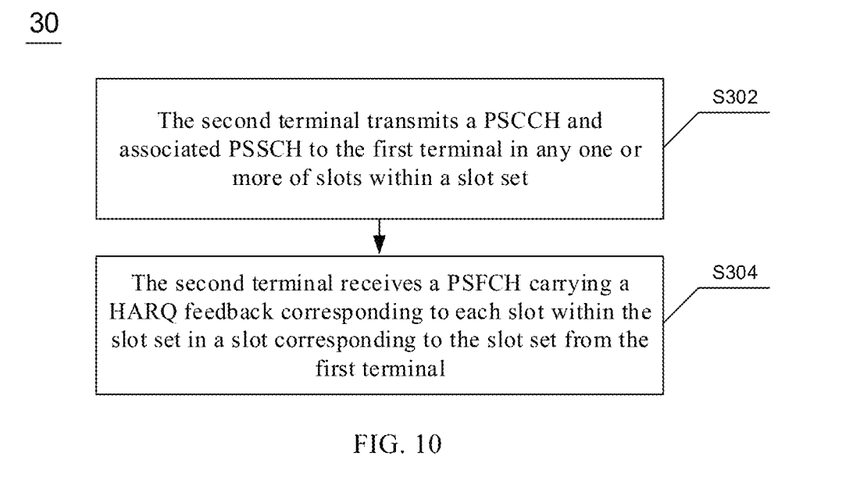
FIG. 10 schematically illustrates a flowchart of a data transmission method according to another embodiment of the present disclosure.

FIG. 10 schematically illustrates a flowchart of a data transmission method according to another embodiment of the present disclosure. The method may be applied, for example, to the second terminal 13 in FIG. 4.

Referring to FIG. 10, the method 30 comprises:

In Step S302, the second terminal transmits a PSCCH and associated PSSCH to the first terminal in any one or more of slots within a slot set.

A PSSCH is said to be "associated" to a PSCCH when the PSCCH carries at least the SCI necessary to decode the PSSCH.

In Step S304, the second terminal receives a PSFCH carrying a HARQ feedback corresponding to each slot within the slot set in a slot corresponding to the slot set from the first terminal.

The slot set comprises one or more slots.

In an embodiment of the present disclosure, there are N bit fields in the PSFCH. N equals to the number of slots within the slot set and each bit field corresponds to one slot within the slot set. As shown in FIG. 6, for example, N=4, there are 4 bit fields in the PSFCH payload, each of them carries HARQ feedback corresponding to PSSCH of slots 2, 3, 4 and 5 separately. For example, the 1st bit field corresponds to PSSCH in slot 5, and 2nd bit field corresponds to PSSCH in slot 4, and so on.

The mapping between the position of bit field in PSFCH and slot index within the slot set is not limited to the examples described herein. For example, it is possible that the 1st bit field corresponds to slot 2 and the 2nd bit field corresponds to slot 3, etc.

For N=1, i.e., the slot set includes one slot. There will be one bit field corresponding to the only slot.

The number of bits of each bit field in PSFCH may be the same. And the number of bits of each bit field is determined by the maximal possible number of HARQ feedback information bits corresponds to one PSSCH transmitted within the slot set.

E.g. for TB based HARQ feedback, there is 1 HARQ feedback bit corresponds to each TB. The maximal number of TB per PSSCH transmission can be pre-configured, or configured by network.

For CBG based HARQ feedback, there is 1 HARQ feedback bit corresponds to each CBG. One TB can be divided to several CBGs. The maximal number of CBG per PSSCH transmission can be pre-configured, or configured by network.

If only TB based HARQ feedback is supported, then the number of HARQ feedback information bits of each bit field in PSFCH is determined by the maximal number of TB per PSSCH transmission. If CBG based HARQ feedback is supported, then the number of HARQ feedback information bits of each bit field in PSFCH is determined by the multiply of maximal number of TB per PSSCH transmission and the maximal number of CBG per PSSCH transmission.

The number of bits of each bit field in PSFCH may also be pre-configured or configured per resource pool. A resource pool is a set of time-frequency resources that can be used for SL transmission and/or reception.

In an embodiment of the present disclosure, the method 30 further comprises: the second terminal detects the PSFCH in candidate transmission resources determined by the transmitted PSCCH or transmitted PSSCH sequentially.

For example, the second terminal may detect the PSFCH based on the transmitted PSCCH or the transmitted PSSCH from first to last sequentially. As mentioned above, referring FIG. 8, from the second terminal side, it needs to detect PSFCH transmitted from the first terminal. While it cannot know whether there is PSCCH missed by the first terminal, and which slot is the first slot that the first terminal detect PSCCH. But it can know that the transmission resource of PSFCH from the first terminal can only be determined by the resource of transmitted PSCCH/PSSCH from the second terminal. Then it can do blind detection of PSFCH in all of the possible transmission resource which is determined by the transmitted PSCCH/PSSCH. If the second terminal transmits PSSCH in slot 0) and slot 1, there are 2 possible PSFCH transmission resources. Since it does not know which the first correctly decoded PSCCH is, it has to do blind detection of all of 2 transmission resources. If the second terminal transmits PSSCH only in slot 2, there is 1 possible PSFCH transmission resource. It can detect PSFCH on the only possible transmission resource. Therefore, the maximal number of blind detection of PSFCH depends on the number of PSSCHs transmitted within the slot set. If there are P (P<=N) PSSCHs transmitted, the second terminal needs to blind decode PSFCH at most P times. Once a PSFCH is detected, it can stop detecting other candidate PSFCH transmission(s) from the first terminal.

For another example, the second terminal may detect the PSFCH based on the transmitted PSCCH or the transmitted PSSCH from last to first sequentially.

For another example, the second terminal may detect the PSFCH based on the transmitted PSCCH or the transmitted PSSCH according to priority from highest to lowest sequentially. As mentioned above, the priority information may be carried in PSCCH. For example, 3 bits is used to indicate the priority level, wherein the value 0 corresponds to the highest priority and the value 7 corresponds to the lowest priority, or the value 7 corresponds to the highest priority and the value 0 corresponds to the lowest priority.

The candidate transmission resource may include the transmission resource in frequency domain, and/or the transmission resource in code domain.

In an embodiment of the present disclosure, before detecting the PSFCH in candidate transmission resources determined by every transmitted PSCCH or transmitted PSSCH blindly, the method 30 further comprises: the second terminal filters each candidate transmission resource, e.g. with a band-pass filter. So that the IBE effect of terminals in other frequency resource can be mitigated.

The following is embodiments of the device of the present disclosure, which can be used to carry out the method embodiments of the present disclosure. For details not disclosed in the embodiment of the device of the present disclosure, please refer to the method embodiments of the present disclosure.

Figure 11:
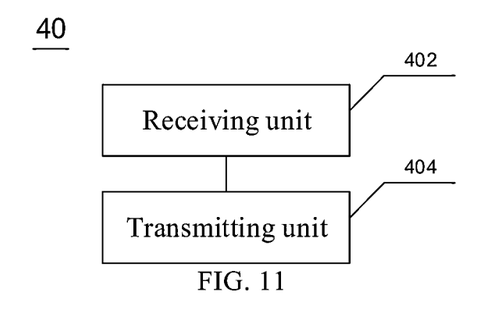
FIG. 11 schematically illustrates a terminal according to an embodiment of the present disclosure.

FIG. 11 schematically illustrates a terminal according to an embodiment of the present disclosure. The terminal may be the first terminal 12 in FIG. 4.

Referring to FIG. 11, the terminal 40 comprises: a receiving unit 402 and a transmitting unit 404.

The receiving unit 402 is configured to monitor PSCCHs in each slot within a slot set separately, to detect whether exists a PSCCH transmitted from a second terminal targeting to the terminal 40 in each slot within a slot set and receive an associated PSSCH based on each detected PSCCH targeting to the first terminal.

The transmitting unit 404 is configured to transmit one PSFCH carrying a HARQ feedback corresponding to each associated PSSCH in a slot corresponding to the slot set.

Wherein, the slot set comprises one or more slots.

In embodiments of the present disclosure, there are N bit fields in the PSFCH: N equals to the number of slots within the slot set and each bit field corresponds to one slot within the slot set.

In embodiments of the present disclosure, there are M bits in each bit field: M equals to the maximal number of TBs supported in one PSSCH and each bit corresponds to a HARQ feedback of one TB in the PSSCH.

In embodiments of the present disclosure, there are M bits in each bit field: M equals to the maximal number of CBGs supported in one PSSCH and each bit corresponds to a HARQ feedback of one CBG in the PSSCH.

In embodiments of the present disclosure, there are M bits in each bit field: M equals to the maximal number of TBs supported in one PSSCH multiplying by the maximal number of CBGs supported in one PSSCH and each bit corresponds to a HARQ feedback of one CBG per TB.

In embodiments of the present disclosure, there are M bits in each bit field: M is pre-configured or configured per resource pool.

In embodiments of the present disclosure, for each slot within the slot set, the HARQ feedback is set to NACK when the PSCCH transmitted from the second terminal targeting to the terminal 40 not being detected.

In embodiments of the present disclosure, transmission resource of the PSFCH is determined based on the transmission resource of one of the detected PSCCHs, or based on transmission resource of the PSSCH which corresponds to one of the detected PSCCHs.

In embodiments of the present disclosure, transmission resource of the PSFCH is determined based on the transmission resource of the first detected PSCCH, or based on transmission resource of the PSSCH which corresponds to the first detected PSCCH.

In embodiments of the present disclosure, transmission resource of the PSFCH is determined based on the transmission resource of the last detected PSCCH, or based on transmission resource of the PSSCH which corresponds to the last detected PSCCH.

In embodiments of the present disclosure, transmission resource of the PSFCH is determined based on the transmission resource of the PSCCH with the highest priority among the detected PSCCH, or based on transmission resource of the PSSCH which corresponds to the PSCCH with the highest priority among the detected PSCCH.

In embodiments of the present disclosure, the transmission resource of the PSFCH includes the transmission resource of the PSFCH in frequency domain.

In embodiments of the present disclosure, the transmission resource of the PSFCH includes the transmission resource of the PSFCH in code domain.

In embodiments of the present disclosure, transmission resource of the PSFCH is indicated in at least one of the detected SCIs transmitted from the second terminal targeting to the terminal.

In embodiments of the present disclosure, transmission resource of the PSFCH is indicated by an index, which is used to determine the transmission resource of the PSFCH.

In embodiments of the present disclosure, the index is configured in a table, in which different transmission resources with different indexes are pre-defined.

In embodiments of the present disclosure, the transmission resource of the PSFCH includes at least one of following resources: transmission resource in frequency domain, transmission resource in time domain and transmission resource in code domain.

In embodiments of the present disclosure, the time offset between the slot of PSFCH and the slot of PSSCH is pre-configured or configured by network.

Figure 13:
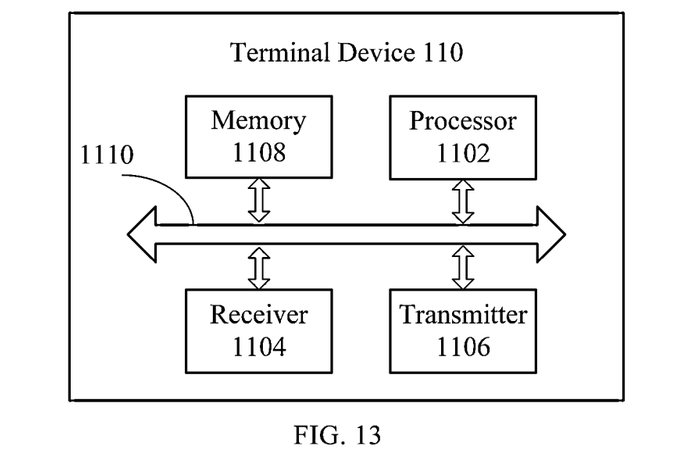
FIG. 13 schematically illustrates a terminal device according to an embodiment of the present disclosure.

It is important to note that, in the embodiment of the disclosure, the receiving unit 402 may be implemented by a receiver (e.g. the receiver 1104 in FIG. 13) and the transmitting unit 404 may be implemented by a transmitter (e.g. the transmitter 1106 in FIG. 13).

FIG. 13 schematically illustrates a terminal device according to an embodiment of the present disclosure.

As illustrated in FIG. 13, a terminal device 110 may include a processor 1102, a receiver 1104, a transmitter 1106 and a memory 1108, wherein the memory 1108 may be configured to store a code executed by the processor 1102 an the like.

Each component in the terminal device 110 is coupled together through a bus system 1110, wherein the bus system 1010 includes a data bus, and further includes a power bus, a control bus and a state signal bus.

Figure 12:
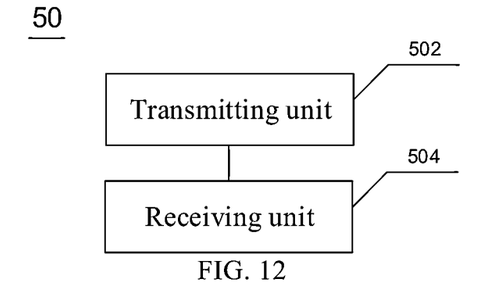
FIG. 12 schematically illustrates a terminal according to another embodiment of the present disclosure.

The terminal 60 illustrated in FIG. 11 and the terminal device 110 illustrated in FIG. 12 may implement each process implanted by the first terminal 12 in the abovementioned method embodiments and will not be elaborated herein to avoid repetitions.

The processor 1102 typically controls overall operations of the terminal device 110, such as the operations associated with display, data communications and recording operations. The processor 1102 may include one or more processors to execute codes in the memory 1108. Optionally, when the codes are executed, the processor 1102 implements the method performed by the first terminal device 12 in the method embodiment, which will not be repeated here for brevity. Moreover, the processor 1102 may include one or more modules which facilitate the interaction between the processor 1102 and other components.

The memory 1108 is configured to store various types of data to support the operation of the terminal device 110. Examples of such data include instructions for any applications or methods operated on the terminal device 110, contact data, phonebook data, messages, pictures, video, etc. The memory 1008 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory or a magnetic or optical disk.

The receiver 1104 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1106 is configured to generate and modulate the RF current and transmit the radio waves through the antenna.

In embodiments of the present disclosure, the transmitter 1106 and receiver 1104 may be implemented as a transceiver.

FIG. 12 schematically illustrates a terminal according to another embodiment of the present disclosure. The terminal may be the second terminal 13 in FIG. 4.

Referring to FIG. 12, the terminal 50 comprises: a transmitting unit 502 and a receiving unit 504.

The transmitting unit 502 is configured to transmit a PSCCH and associated PSSCH in any one or more of slots within a slot set to a first terminal.

The receiving unit 504 is configured to receive a PSFCH carrying a HARQ feedback corresponding to each slot within the slot set in a slot corresponding to the slot set from the first terminal.

Wherein, the slot set comprises one or more slots.

In embodiments of the present disclosure, there are N bit fields in the PSFCH: N equals to the number of slots within the slot set and each bit field corresponds to one slot within the slot set.

In embodiments of the present disclosure, there are M bits in each bit field: M equals to the maximal number of TBs supported in one PSSCH and each bit corresponds to a HARQ feedback of one TB in the PSSCH.

In embodiments of the present disclosure, there are M bits in each bit field: M equals to the maximal number of CBGs supported in one PSSCH and each bit corresponds to a HARQ feedback of one CBG in the PSSCH.

In embodiments of the present disclosure, there are M bits in each bit field: M equals to the maximal number of TBs supported in one PSSCH multiplying by the maximal number of CBGs supported in one PSSCH and each bit corresponds to a HARQ feedback of one CBG per TB.

In embodiments of the present disclosure, there are M bits in each bit field: M is pre-configured or configured per resource pool.

In embodiments of the present disclosure, the receiving unit 504 is further configured to detect the PSFCH in candidate transmission resources determined by the transmitted PSCCH or transmitted PSSCH sequentially.

In embodiments of the present disclosure, the receiving unit 504 is further configured to detect the PSFCH based on the transmitted PSCCH or the transmitted PSSCH from first to last sequentially.

In embodiments of the present disclosure, the receiving unit 504 is further configured to detect the PSFCH based on the transmitted PSCCH or the transmitted PSSCH from last to first sequentially.

In embodiments of the present disclosure, the receiving unit 504 is further configured to detect the PSFCH based on the transmitted PSCCH or the transmitted PSSCH according to priority from highest to lowest sequentially.

In embodiments of the present disclosure, the candidate transmission resource includes the transmission resource in frequency domain.

In embodiments of the present disclosure, the candidate transmission resource includes the transmission resource in code domain.

In embodiments of the present disclosure, the receiving unit 504 is further configured to filter each candidate transmission resource.

Figure 14:
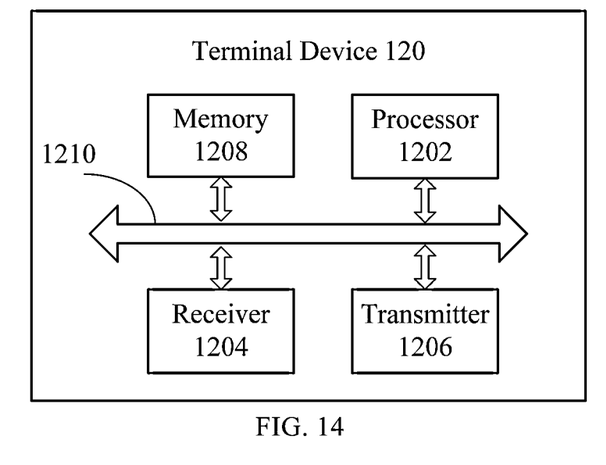
FIG. 14 schematically illustrates a terminal device according to another embodiment of the present disclosure.

It is important to note that, in the embodiment of the disclosure, the receiving unit 504 may be implemented by a receiver (e.g. the receiver 1204 in FIG. 14) and the transmitting unit 502 may be implemented by a transmitter (e.g. the transmitter 1206 in FIG. 14).

FIG. 14 schematically illustrates a terminal device according to another embodiment of the present disclosure.

As illustrated in FIG. 14, a terminal device 120 may include a processor 1202, a receiver 1204, a transmitter 1206 and a memory 1208, wherein the memory 1208 may be configured to store a code executed by the processor 1202 an the like.

Each component in the terminal device 120 is coupled together through a bus system 1210, wherein the bus system 1210 includes a data bus, and further includes a power bus, a control bus and a state signal bus.

The processor 1202 typically controls overall operations of the terminal device 120, such as the operations associated with display, data communications and recording operations. The processor 1202 may include one or more processors to execute codes in the memory 1208. Optionally, when the codes are executed, the processor 1202 implements the method performed by the second terminal device 13 in the method embodiment, which will not be repeated here for brevity. Moreover, the processor 1202 may include one or more modules which facilitate the interaction between the processor 1202 and other components.

The memory 1208 is configured to store various types of data to support the operation of the terminal device 120. Examples of such data include instructions for any applications or methods operated on the terminal device 120, contact data, phonebook data, messages, pictures, video, etc. The memory 1008 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The receiver 1204 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1206 is configured to generate and modulate the RF current and transmit the radio waves through the antenna.

In embodiments of the present disclosure, the transmitter 1206 and receiver 1204 may be implemented as a transceiver.

The terminal 50 illustrated in FIG. 12 and the terminal device 120 illustrated in FIG. 14 may implement each process implanted by the second terminal 13 in the above-mentioned method embodiments and will not be elaborated herein to avoid repetitions.

Exemplary embodiments have been specifically shown and described as above. It will be appreciated by those skilled in the art that the disclosure is not limited the disclosed embodiments: rather, all suitable modifications and equivalent which come within the spirit and scope of the appended claims are intended to fall within the scope of the disclosure.

What is claimed is:

1. A data transmission method, comprising:
monitoring, by a first terminal, a physical sidelink control channel (PSCCH) in each slot within a slot set separately, to detect whether exists a PSCCH transmitted from a second terminal targeting to the first terminal in each slot within the slot set;
receiving, by the first terminal, an associated physical sidelink shared channel (PSSCH) based on each detected PSCCH targeting to the first terminal; and
transmitting, by the first terminal, one physical sidelink feedback channel (PSFCH) carrying a HARQ feedback corresponding to each slot within the slot set in a slot corresponding to the slot set;
wherein, the slot set comprises one or more slots,
wherein there are N bit fields in the PSFCH, N equals to a number of slots within the slot set and each bit field corresponds to one slot within the slot set, and
wherein there are M bits in each bit field, M equals to a maximal number of transport blocks (TBs) supported in one PSSCH multiplying by a maximal number of code block groups (CBGs) supported in one PSSCH, and each bit corresponds to a hybrid automatic repeat request (HARQ) feedback of one CBG per TB.

2. The method according to claim 1, wherein M is pre-configured or configured per resource pool.

3. The method according to claim 1, wherein for each slot within the slot set, the HARQ feedback is set to NACK when the PSCCH transmitted from the second terminal targeting to the first terminal not being detected.

4. The method according to claim 1, wherein transmission resource of the PSFCH is determined based on the transmission resource of one of the detected PSCCHs, or based on transmission resource of the PSSCH which corresponds to one of the detected PSCCHs.

5. The method according to claim 4, wherein transmission resource of the PSFCH is determined based on the transmission resource of the first detected PSCCH, or based on transmission resource of the PSSCH which corresponds to the first detected PSCCH.

6. The method according to claim 4, wherein transmission resource of the PSFCH is determined based on the transmission resource of the PSCCH with a highest priority among the detected PSCCH, or based on transmission resource of the PSSCH which corresponds to the PSCCH with the highest priority among the detected PSCCH.

7. The method according to claim 1, wherein transmission resource of the PSFCH is indicated in at least one of the detected sidelink control information (SCIs) transmitted from the second terminal targeting to the first terminal.

8. A data transmission method, comprising:
transmitting, by a second terminal, a physical sidelink control channel (PSCCH) and associated physical sidelink shared channel (PSSCH) PSSCH in any one or more of slots within a slot set to a first terminal; and
receiving, by the second terminal, a physical sidelink feedback channel (PSFCH) carrying a HARQ feedback corresponding to each slot within the slot set in a slot corresponding to the slot set from the first terminal;
wherein, the slot set comprises one or more slots,
wherein there are N bit fields in the PSFCH, N equals to a number of slots within the slot set and each bit field corresponds to one slot within the slot set, and
wherein there are M bits in each bit field, M equals to a maximal number of transport blocks (TBs) supported in one PSSCH multiplying by a maximal number of code block groups (CBGs) supported in one PSSCH, and each bit corresponds to a hybrid automatic repeat request (HARQ) feedback of one CBG per TB.

9. The method according to claim 8, wherein M is pre-configured or configured per resource pool.

10. The method according to claim 8, further comprising:
detecting, by the second terminal, the PSFCH in candidate transmission resources determined by the transmitted PSCCH or transmitted PSSCH sequentially.

11. The method according to claim 10, wherein the detecting the PSFCH in candidate transmission resources determined by the transmitted PSCCH or transmitted PSSCH sequentially comprises: detecting the PSFCH based on the transmitted PSCCH or the transmitted PSSCH from first to last sequentially.

12. The method according to claim 10, wherein the detecting the PSFCH in candidate transmission resources determined by the transmitted PSCCH or transmitted PSSCH sequentially comprises: detecting the PSFCH based on the transmitted PSCCH or the transmitted PSSCH from last to first sequentially.

13. The method according to claim 10, wherein the detecting the PSFCH in candidate transmission resources determined by the transmitted PSCCH or transmitted PSSCH sequentially comprises: detecting the PSFCH based on the transmitted PSCCH or the transmitted PSSCH according to priority from highest to lowest sequentially.

14. The method according to claim 8, further comprising:
filtering, by the second terminal, each candidate transmission resource.

15. A terminal device, comprising:
a processor;
a memory configured to store instructions executable by the processor,
wherein the processor is configured to perform steps of a data transmission method, comprising:
monitoring, by a first terminal, a physical sidelink control channel (PSCCH) in each slot within a slot set separately, to detect whether exists a PSCCH transmitted from a second terminal targeting to the first terminal in each slot within the slot set;
receiving, by the first terminal, an associated physical sidelink shared channel (PSSCH) based on each detected PSCCH targeting to the first terminal; and
transmitting, by the first terminal, one physical sidelink feedback channel (PSFCH) carrying a HARQ feedback corresponding to each slot within the slot set in a slot corresponding to the slot set;
wherein, the slot set comprises one or more slots,
wherein there are N bit fields in the PSFCH, N equals to a number of slots within the slot set and each bit field corresponds to one slot within the slot set, and
wherein there are M bits in each bit field, M equals to a maximal number of transport blocks (TBs) supported in one PSSCH multiplying by a maximal number of code block groups (CBGs) supported in one PSSCH, and each bit corresponds to a hybrid automatic repeat request (HARQ) feedback of one CBG per TB.

* * * * *